United States Patent [19]

Poncet

[11] Patent Number: 4,534,697
[45] Date of Patent: Aug. 13, 1985

[54] TRANSFER DEVICE FOR ROBOTS

[75] Inventor: Jean-Pierre Poncet, Saint Ismier, France

[73] Assignee: Allibert S.A., France

[21] Appl. No.: 503,594

[22] Filed: Jun. 13, 1983

[30] Foreign Application Priority Data

Jun. 17, 1982 [FR] France ............................... 82 10619

[51] Int. Cl.³ .............................................. B65C 1/00
[52] U.S. Cl. ......................................... 414/787; 414/7;
901/21; 52/121; 74/110
[58] Field of Search .................... 414/7, 718, 749, 751,
414/753, 589, 787; 74/110; 212/269, 267;
901/21; 52/114, 121

[56] References Cited

U.S. PATENT DOCUMENTS 3,481,490 12/1969 Eiler ................................... 212/269
3,666,125 5/1972 Gano et al. ........................ 414/718

FOREIGN PATENT DOCUMENTS

| 50561 | 4/1982 | European Pat. Off. . |
| 1191667 | 10/1959 | France . |
| 167849 | 6/1964 | France . |
| 1404571 | 5/1965 | France ............................. 212/267 |
| 1492931 | 7/1967 | France ............................. 212/267 |
| 2134034 | 12/1972 | France . |
| 2187071 | 1/1974 | France . |
| 802506 | 8/1958 | United Kingdom . |
| 831606 | 5/1981 | U.S.S.R. ............................. 901/23 |

Primary Examiner—Leslie J. Paperner
Assistant Examiner—Donald W. Underwood
Attorney, Agent, or Firm—Steinberg & Raskin

[57] ABSTRACT

A transfer device for an industrial robot includes two members, preferably having tubular shapes, the first member being extendable and/or retractable over a certain distance and a second member, preferably telescopically coupled to the first member, which is extendable and/or retractable over substantially the same distance with respect to the first member so that the second member is extendable and/or retractable over about twice the distance the first member is moved with respect to a fixed reference point. The device further comprises a support on which the first member is mounted, first drive apparatus for extending and/or retracting the first member with respect to the support and second apparatus for extending and/or retracting the second member with respect to the first member.

5 Claims, 8 Drawing Figures

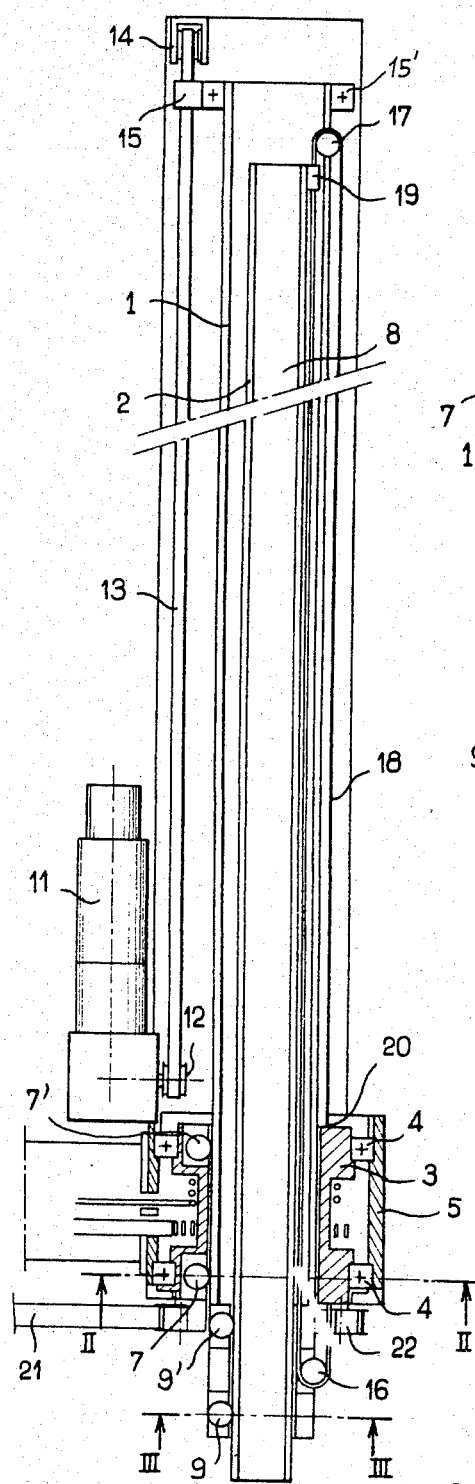
FIG_1
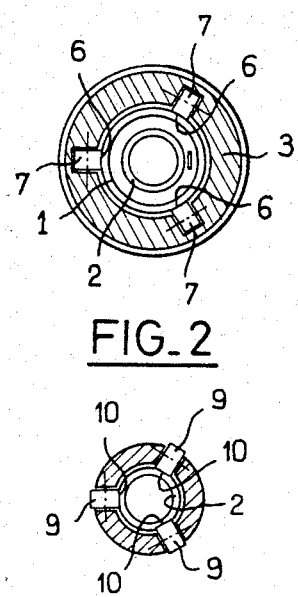
FIG_2
FIG_3
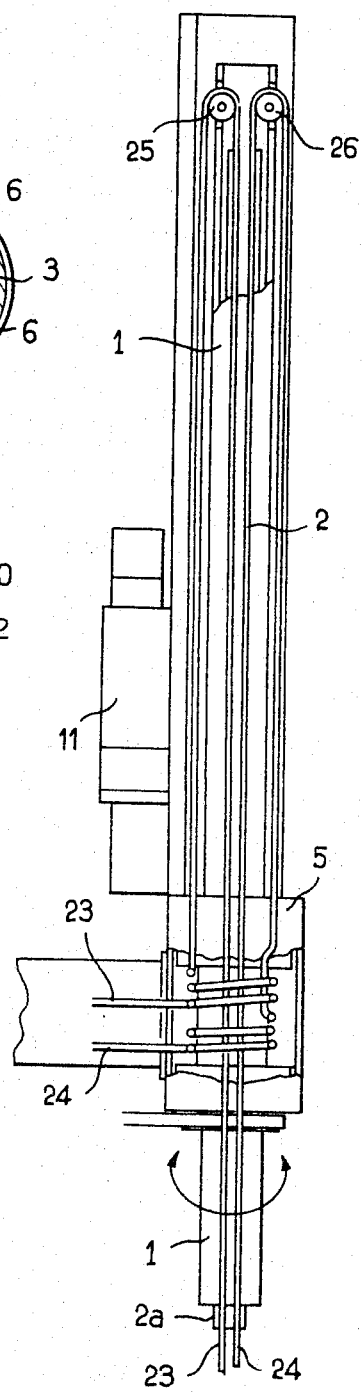
FIG_4

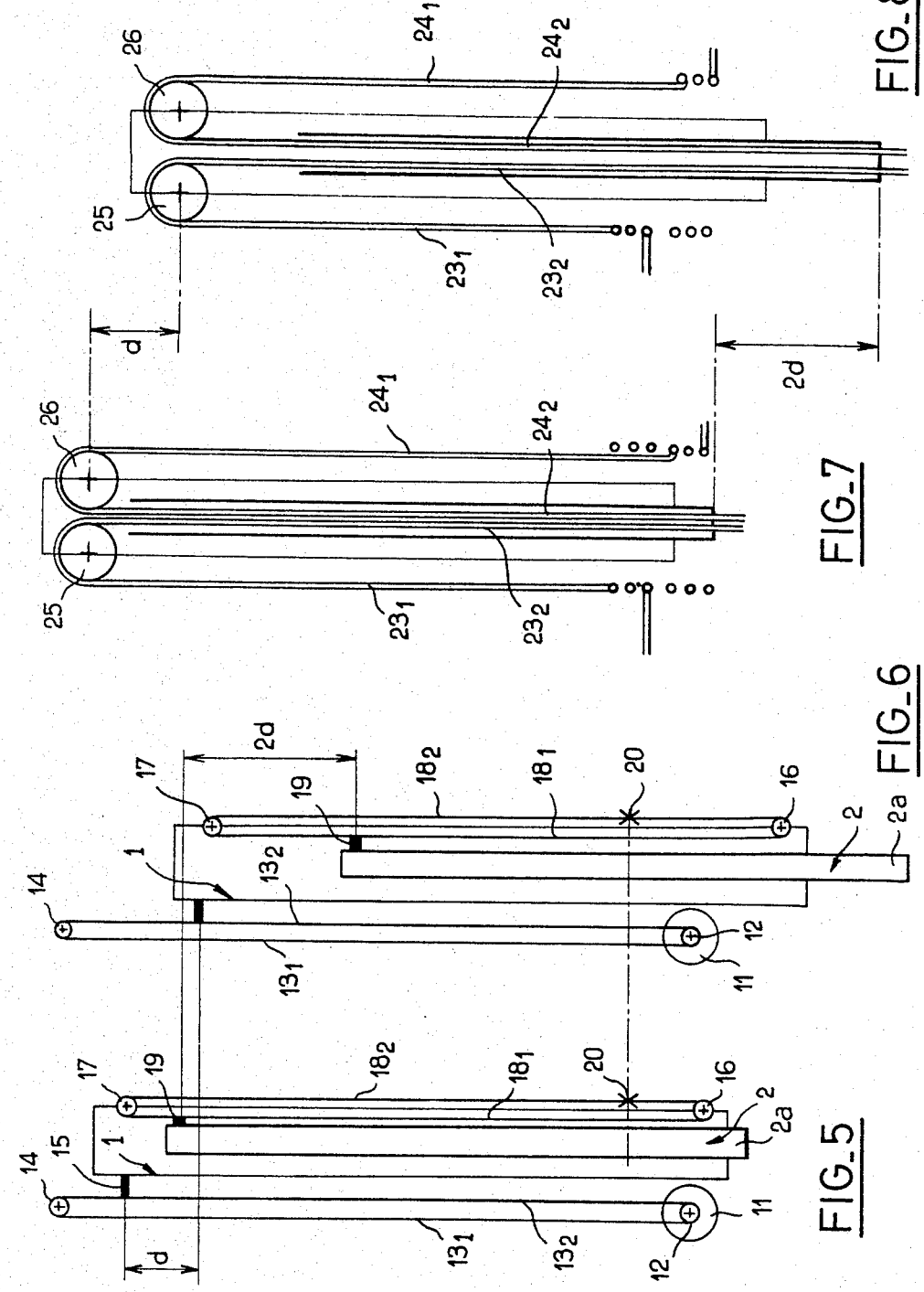

TRANSFER DEVICE FOR ROBOTS

BACKGROUND OF THE INVENTION

This invention relates to a telescopic transfer device, especially for industrial robots.

Industrial robots are becoming increasingly important and are being developed more and more in industry. One of the basic components entering into the construction of these robots is a telescopic transfer device providing a linear translational displacement. Through the use of several devices of this type arranged at different angles, it is possible to obtain any displacement motion of an object from one place to another, for example. In addition, if the telescopic transfer device is permitted to rotate around its own axis, then facility of the displacement motion as well as the versatility of the robot are further increased.

The invention relates to such a telescopic transfer device which can constitute a basic component of an industrial robot, such device having substantial advantages with regard to its reliability, precision of control of both translational and rotational displacement, simplicity of execution and corresponding economy of production. In addition, the device is extremely compact and its use is particularly convenient, especially taking into account the fact that most electric and/or automatic supply lines which are designed to control the head of the robot mounted at the extremity of the telescopic arm are also housed inside the device. It makes it possible to obtain a large stroke and high speed of displacement of the mobile extremity of the arm and provides for easy programming of the motions carried out.

SUMMARY OF THE INVENTION

The present invention is directed to a device which is extendable and/or retractable, which comprises two members which can be in the shape of a tube, the first member extendable and/or retractable over a certain distance, and a second member which is extendable and/or retractable over the same distance but with respect to the first member, so that the second member is extendable and/or retractable over about twice the distance the first member is moved. Additionally the device comprises a support connected with the first member, first means for extending and/or retracting the first member with respect to the support which is engaged with the support and the first member, and second means for extending and/or retracting the second member with respect to the first member, which is engaged with the second member and the support through the first member.

The telescopic transfer device which is the object of the invention is characterized, in particular, by the fact that it comprises at least two tubular members sliding telescopically with respect to one another, motor control means of the device comprising at least one motor actuating one of the tubular members in a positive fashion and in a direction substantially parallel to the median axis of the tubular members and reciprocally in one direction or the other, and means such as pulleys, belts, cables, gears mounted freely or loosely connected with a fixed point of the support of the device, and ensuring the coupling of the tubular members to one another so that when the first member is driven by the previously mentioned motor over a distance d with respect to said fixed support, the second member is driven in the same direction over an equal distance d with respect to said first member.

According to a preferred embodiment, the motor control means of the device include a cable, a belt or similar item with one strand stretched in a direction substantially parallel to the median axis of the tubular members, reciprocally displaceable in this direction, and also connected to one of the tubular members, at least at one point.

Similarly, and preferably, the coupling means of the tubular members includes a stretched cable or belt where two strands are formed between two pulleys or gears mounted on said first tubular member, the two strands extend over practically the entire length of the first tubular member, one strand of the cable or the belt being attached at a point on the second tubular member and the other strand being attached at a fixed point on the support for the device.

Preferably, the second tubular member is telescopically, slidingly mounted inside the first one.

It is simple to control the stroke or movement $2d$ of the inner tubular member in a precise manner through the positive movement of the first external tubular member through distance d, with the above features being provided in the telescopic device.

According to another characteristic of the invention, the sliding, guiding action of the second tubular member with the first tubular member is effected through the use of rollers mounted inside the first tubular member which roll on tracks formed by flat bars provided on the external wall of the second tubular member. A similar guiding device provides for the sliding of the first tubular member inside the fixed support for the device. Under these conditions, a precise, definite angular orientation of the second tubular member is obtained. It is also possible for the overall cross-sections of both tubular members to be circular, facilitating construction and engagement in all respects.

According to another characteristic of the invention, electric and/or pneumatic control means, controlled from the extremity of the second tubular member, is power-supplied by flexible lines passing through the inside of the second tubular member to the other extremity of the first tubular member, then around pulleys or similar guides and along the outside of the first tubular member, with the lines being attached to the support at supply points. Such an arrangement makes it possible to pass the supply lines through the inside of the telescopic arm, thus avoiding, the arrangement of such feed through external cables as in most conventional assemblies, which cause congestion of work space and which may suffer damage.

According to another characteristic of the invention, the first tubular member is rotatably mounted in rotational bearings linked to said support. It is then possible to cause the device to rotate through the desired angle, the system of bearings and flat tracks formed on the tubes making it possible to control in a precise fashion the angular spatial position of the second tubular member with respect to the support as a reference point. In such a design, the supply through flexible lines passing through the inside of the device may be sustained by simply winding the supply lines around the base of the first tubular member in a loose fashion in helical form, with approximately two or three turns. The rotational motion imparted to the telescopic device will give rise, under these conditions, to a simple modification of the winding diameter, thus recovering the difference in length due to the variable angular orientation of the control arm made up by the two telescopic tubular members.

BRIEF DESCRIPTION OF THE DRAWINGS

The invention and its application will be further explained by the following description with reference to the accompanying drawings in which:

FIG. 1 is an elevational view in partial section of the essential components of a telescopic transfer device according to the invention;

FIGS. 2 and 3 are sectional views along planes II—II and III—III respectively of FIG. 1 through the transfer device with the support being removed;

FIG. 4 illustrates on a smaller scale, similar to FIG. 1, the assembly of supply lines of the electric and/or pneumatic control means with which the robot is equipped and which are associated with this telescopic arm;

FIGS. 5 and 6 schematically illustrate the principle of the transfer of motion between members of the telescopic arm; and FIGS. 7 and 8 schematically illustrate the principle used for guiding the supply lines passing through the inside of the telescopic arm.

DETAILED DESCRIPTION OF PREFERRED EMBODIMENTS

Referring to FIGS. 1 to 3, the telescopic transfer device basically comprises two respective tubular members 1 and 2 which telescopically slide, one inside the other. In the illustrated example of a preferred embodiment, these members are formed as tubes with a general circular section, which is most practical from the point of view of production and provides the greatest strength for the smallest volume.

The assembly of tubes 1 and 2 is mounted on the inside of a hub 3 which is itself supported by rollers or bearings 4 which provide for rotation in a support 5 of the device. In the following description, it will be assumed that the support is "stationary", the word "base" will be used to designate the lower adjacent part of support 5 illustrated in FIG. 1 and the word "top" will be used to denote the opposite part situated towards the upper part of the figure. It should be noted, however, that the "stationary" support 5 can be perfectly mobile inside a more complex device acting as a robot, and that it is designated as "stationary" only as a point of reference.

In order to effect the slide guidance of tube 1 within hub 3, three flat bars 6, illustrated more distinctly in FIG. 2, forming rectilinear tracks oriented at 120° with respect to one another on the peripheral wall of tube 1, have been provided. Two sets of three rollers 7, 7' roll over these tracks 6, thus ensuring a perfect rectilinear guiding action, parallel to axis 8 of tube 1 within supporting hub 3. The assembly can be enhanced by providing for example, on the two rollers 7, 7' which are illustrated in FIG. 1, elastic clearance recovery means such as elastic washers (not shown) which exert a pressing action on these rollers against opposing tracks 6.

The telescopic assembly and guidance of the internal tube 2 inside tube 1 is effected in a similar manner by means of two sets of three rollers 9, 9' mounted at the base of external tube 1 as illustrated in FIG. 3, with these rollers traveling over three tracks 10 formed by rectilinear flat bars, the tracks being oriented at 120° on the periphery of internal tube 2. An elastic recovery of the assembly can also be provided for two of the roller 9, 9' illustrated in FIG. 1, for example.

Regarding the actuation into motion of the device, motor control means is provided which comprises a hydraulic or electric motor 11, of the incremental drive type, for example. Motor 11 causes the rotation of a pulley 12 which is preferably cogged, through a desired precise definite angle, for the explicit actuation of a flat, cogged belt wound around pulley 12 and of a guide pulley 14 mounted so that it rotates freely at the upper stationary extremity of the device. As will be observed more clearly in the schematic views of FIGS. 5 and 6, the two stands $13_1$, $13_2$ of belt 13 are stretched between pulleys 12 and 14 and one of the strands $13_2$ is affixed at 15 to the upper extremity of tube 1.

Additionally, external tube 1 supports two pulleys 16, 17 (preferably of the same type as pulleys 12 and 14) on which a belt 18 is stretched. As can be especially viewed in FIGS. 1 and 5, belt 18, which is preferably of the flat cogged type, is affixed at 19 to the upper extremity of tube 2 and at 20 to stationary hub 3. Pulleys 16 and 17 are mounted so that they can rotate freely.

The displacement functioning of the telescopic arm will now be described by referring more specifically to FIGS. 5 and 6.

When it is desired to displace extremity 2a of telescopic arm 2 through a certain distance, the drive of motor 11 is actuated. When the drive of motor 11 is actuated to set belt 13 into motion over a certain path d, tube 1 is moved through this same distance d, since strand 13 of belt 13 is affixed at 15 to tube 1 through a bearing 15', which also permits rotation of the tube 1 around its median axis 8.

The assembly comprising belt 18 and its guide pulleys 16, 17 is simultaneously moved through the same distance d as tube 1, on which pulleys 16, 17 are mounted. Since strand $18_2$ of belt 18 is attached at 20 to the stationary support of hub 3, the strands of belt 18 unwind and wind on either side through the same distance d. Since strand $18_1$ is affixed at 19 to internal tube 2, tube 2 is moved over a distance which is substantially equal to d with respect to tube 1, and is moved in the same direction as said tube. Therefore, tube 2 accordingly advances by the distance 2d in the direction of the prescribed displacement (with respect to the supports 3, 5, assumed to be stationary).

Because hub 3 is mounted in rotational bearings 4 within stationary support 5, it is additionally possible to effect the rotation of the assembly of telescopic tubes 1 and 2 with hub 3 inside support 5. This rotation through a definite angle can be actuated, for example, using a cogged belt 21 mounted on a cogged pully 22 connected with hub 3. It should be noted that due to the provision of flat bars 6, 10 formed on tubes 1 and 2 respectively, and because of the rollers 7, 9 which press on these tracks, rotational affixation of internal tube 2 with respect to external tube 1 is obtained, which allows for positive rotational control of head 2a of the telescopic arm around axis 8 of the device with respect to support 5.

The electric and/or pneumatic power supply of the control means supported by head 2a of the arm will now be described with reference to FIGS. 4, 7 and 8. This control means can, for example, actuate a gripping head or even provide control and monitoring information to another arm which may itself be telescopic and mounted so that it is supported at the extremity 2a of the device.

According to the illustrated embodiment, it has been assumed that head 2a of the telescopic arm receives pneumatic information through a line 23 and electric information through a line 24. According to the invention, these lines can be essentially mounted inside the arm by using flexible lines of thin tubing type having, for example, a diameter of a few millimeters.

Lines 23, 24 extend from the stationary support 5 and are wound two or three turns in a flexible manner over the base of external tube 1. The lines are then stretched against the external wall of tube 1 up to the upper part of the tube where the lines are wound around two pulleys 25, 26 attached to tube 1, then extend down inside external tube 2 and exit at the extremity of head 2a of the tube.

As can be viewed more distinctly in FIGS. 7 and 8, when tube 1 is moved over a distance d and tube 2 is concomitantly moved over a distance 2d (with respect to the support 5 assumed to be stationary), it can be observed that when the external strands $23_1$, $24_1$ of lines 23, 24 become shorter by a distance d by winding around pulleys 25, 26, internal strands $23_2$, $24_2$ become longer by the corresponding distance. The lines therefore remain correctly stretched and no control line drags on the outside of the telescopic arm.

Furthermore, taking into account the two or three loose winding turns of the lines around the base of tube 1, rotational actuation (for example one turn of head 2a) is possible by simply tightening or loosening the turns wound around the base of tube 1.

The invention is naturally in no way limited to the embodiment illustrated, which has been described as an example only. In particular, it is also possible to mount the tubes, not telescopically into one another, but externally with respect to one another, although internal assembly is generally preferred. Similarly, in order to carry out the driving operation, it is possible to use other types of belts and pulleys, for example, pulleys and belts having trapezoidal grooves or even gears which can produce the same relative driving operations, instead of using flat cogged belts meshing with corresponding gears.

What is claimed is:

1. A telescopic transfer device for use in robots, comprising:
   a support,
   a first tubular member which is extendable/retractable over substantially a certain distance with respect to said support,
   a second tubular member telescopically disposed within said first tubular member, and being extendable/retractable over substantially said certain distance with respect to said first tubular member,
   a first set of three tracks oriented around an outer periphery of said second tubular member at approximate angles of 120° with respect to one another,
   a first set of three rollers disposed on an inner periphery of said first member, with each roller engaging a respective track on said second member,
   a second set of three tracks oriented around an outer periphery of said first member at approximate angles of 120° with respect to one another,
   a second set of three rollers engaged with said support, with each roller engaging a respective track on said first member,
   first means for extending and/or retracting said first member substantially said certain distance with respect to said support, and comprising
   motor means mounted on said support,
   a first pair of pulleys with one affixed to said motor means and the other mounted on said support, and
   first belt means engaged with said motor means and with said first tubular member, wound around said first pair of pulleys, and movable back and forth in a direction substantially parallel to a median axis of said first tubular member,
   second means for extending/retracting said second member substantially said certain distance with respect to said first member, such that upon said first member being extended/retracted in a direction over substantially said certain distance with respect to a fixed point of reference, said second member is extended/retracted over substantially twice said certain distance with respect to the fixed point of reference,
   said second extending/retracting means comprising
   a second pair of pulleys, both affixed to said first tubular member, and
   second belt means engaged with said second member and with said support, and wound around said second pair of pulleys,
   electric and/or pneumatic control means actuatable from an extremity of said second member,
   at least one flexible power supply line engaged with said control means,
   at least one additional pulley situated on said first member, with said at least one power supply line passing along an interior portion of said second member substantially parallel to a median axis of said second member, around said additional pulley, along the outer periphery of said first member, and to said support, and
   means for rotating said first and second members about said respective median axes thereof, which comprises
   a rotatable hub rotatably mounted with respect to said support and engaged with said second set of rollers, and
   a rotatable bearing through which said first belt means is engaged with said first tubular member.

2. The device of claim 1 in which said at least one power supply line is flexibly wound at least twice around said first member substantially at the location where said power supply line passes to said support.

3. The device of claim 2 additionally comprising
   an additional set of three rollers on the inner periphery of said first member, with each set of rollers spaced apart from the adjacent set along said first member, and
   an additional set of three rollers engaged with said support, with each set of rollers spaced apart from the adjacent set of rollers by a distance along the outer periphery of said first member.

4. The device of claim 3 which comprises an additional flexible power supply line engaged with said control means, and
   a second additional pulley situated on said first member, with both said power supply lines passing along an interior portion of said second member, each individual power supply line passing around a respective pulley and along the outer periphery of said first member, and each of said power supply lines being individually flexibly wound at least twice around said first member before passing to said support.

5. The device of claim 4 in which said first and second belt means, and said respective first and second pairs of pulleys are respectively cogged, with said first and second belt means winding around said respective first and second pairs of pulleys in correspondence.

* * * * *